(12) United States Patent
Enns et al.

(10) Patent No.: US 7,197,865 B1
(45) Date of Patent: Apr. 3, 2007

(54) SELF CONTAINED TRANSPORT FOR CROP HARVESTING HEADER

(75) Inventors: John Edward Enns, East St. Paul (CA); Bernie Penner, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 0 days.

(21) Appl. No.: 11/331,366

(22) Filed: Jan. 13, 2006

Related U.S. Application Data

(60) Provisional application No. 60/752,368, filed on Dec. 22, 2005.

(51) Int. Cl.
 *A01B 73/00* (2006.01)
(52) U.S. Cl. ....................................... 56/228
(58) Field of Classification Search ................. 56/228, 56/14.9, DIG. 9, 365, 366, 367, 370, 375, 56/376, 377, 378, 379, 380, 384, 397, 396, 56/15.6, DIG. 10, DIG. 27; 172/240, 669; 180/209
 See application file for complete search history.

(56) References Cited

U.S. PATENT DOCUMENTS

| | | | |
|---|---|---|---|
| 3,279,158 A | 10/1966 | Kirkpatrick et al. | |
| 3,457,709 A | 7/1969 | Kilbery et al. | |
| 3,919,831 A | * 11/1975 | Halls et al. | 56/228 |
| 4,346,909 A | 8/1982 | Hundeby | |
| 4,460,193 A | 7/1984 | Dietz et al. | |
| 4,573,309 A | 3/1986 | Patterson | |
| 5,243,810 A | 9/1993 | Fox et al. | |
| 5,374,082 A | * 12/1994 | Smith | 280/789 |
| 5,970,695 A | 10/1999 | Dunn | |
| 6,209,297 B1 | 4/2001 | Yeomans et al. | |

FOREIGN PATENT DOCUMENTS

CA 973367 8/1975

* cited by examiner

*Primary Examiner*—Árpád Fábián Kovács
(74) *Attorney, Agent, or Firm*—Adrian D. Battison; Michael R. Williams; Ryan W. Dupuis

(57) ABSTRACT

A transport system for a crop header includes a first and a second wheel arrangement on the header frame adjacent a respective ends for acting as a stabilizer when the header is in the operating position and movable to a transport position for transporting the header when removed from the vehicle in a transport direction generally longitudinal of the header frame and at a right angle to the working direction with each being mounted on the header frame for rotation of a rolling direction of the first wheel arrangement between the working position and the transport position, in which the rolling direction is along the transport direction. Each of the wheel arrangements includes two parallel wheels coupled together. The wheel arrangement at the rear end includes a second wheel which is mounted on a swing arm so as to be moved to a position adjacent the cutter bar so that the header is stably supported on the first wheel arrangement, the first wheel of the second wheel arrangement and the second wheel of the second wheel arrangement. The first and second wheels of the second wheel arrangement include coupling members for connection together to operate as a common wheel arrangement in the operating position. The swing arm includes a tower which attaches to the cutter bar and can fold down on to the swing arm in the field position.

16 Claims, 9 Drawing Sheets

Unfolded (Transport Position)

Folded (Field Position)

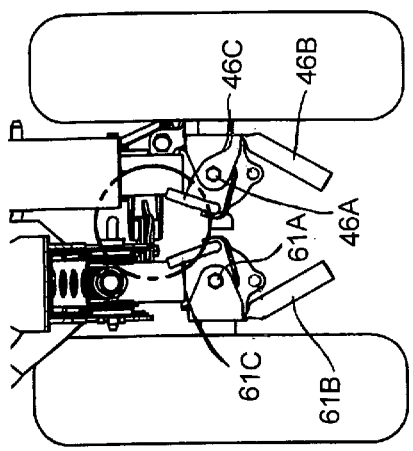
FIG.11 SECTION C-C
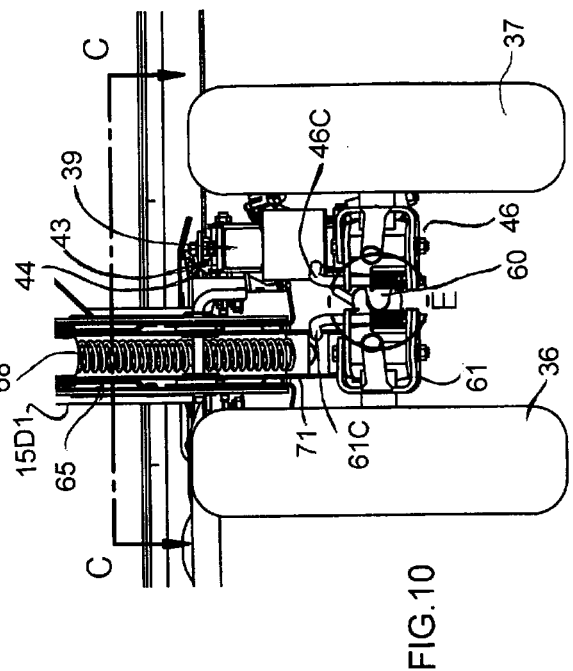
FIG.10
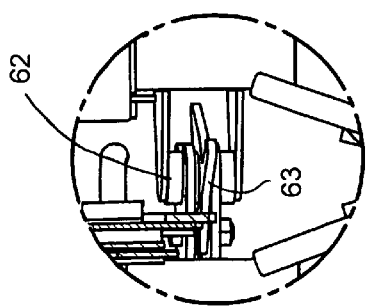
DETAIL D
FIG.12
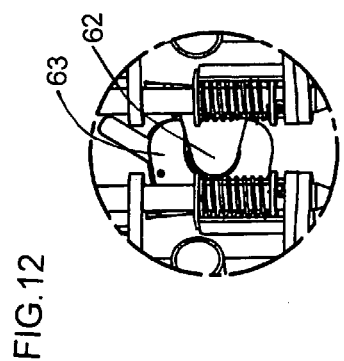
DETAIL E
FIG. 13

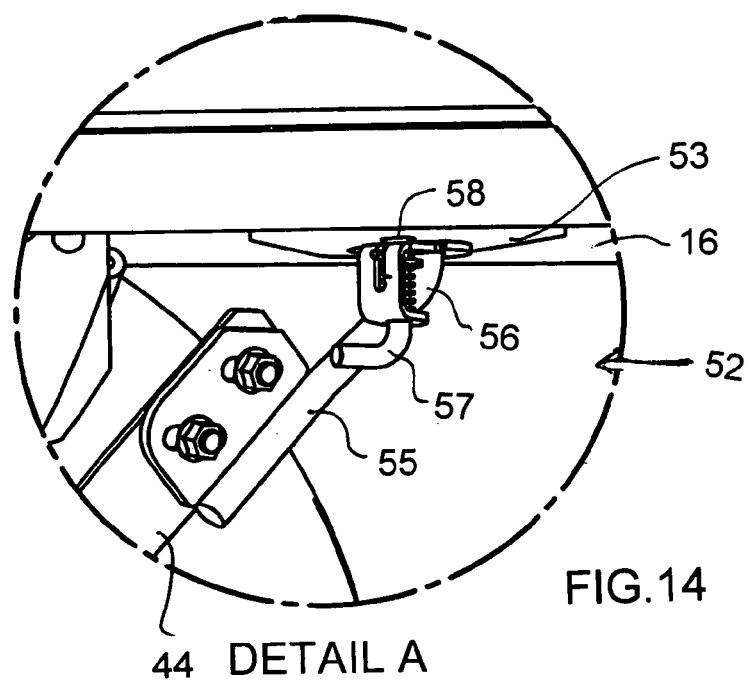
FIG.14 DETAIL A
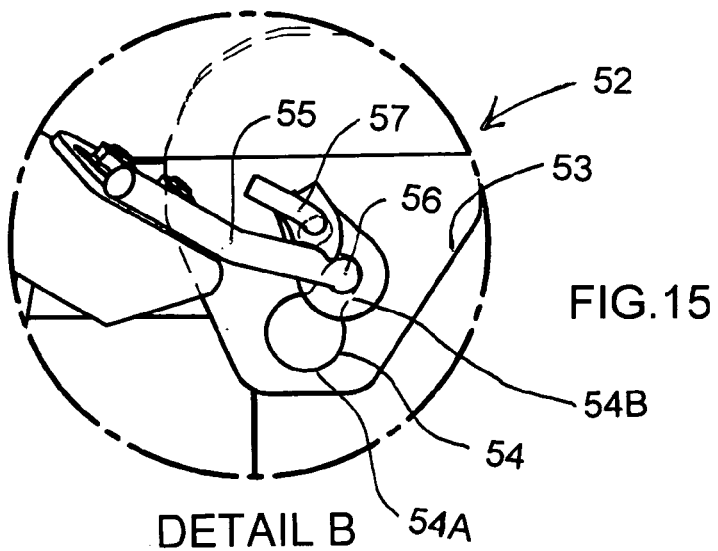
FIG.15 DETAIL B

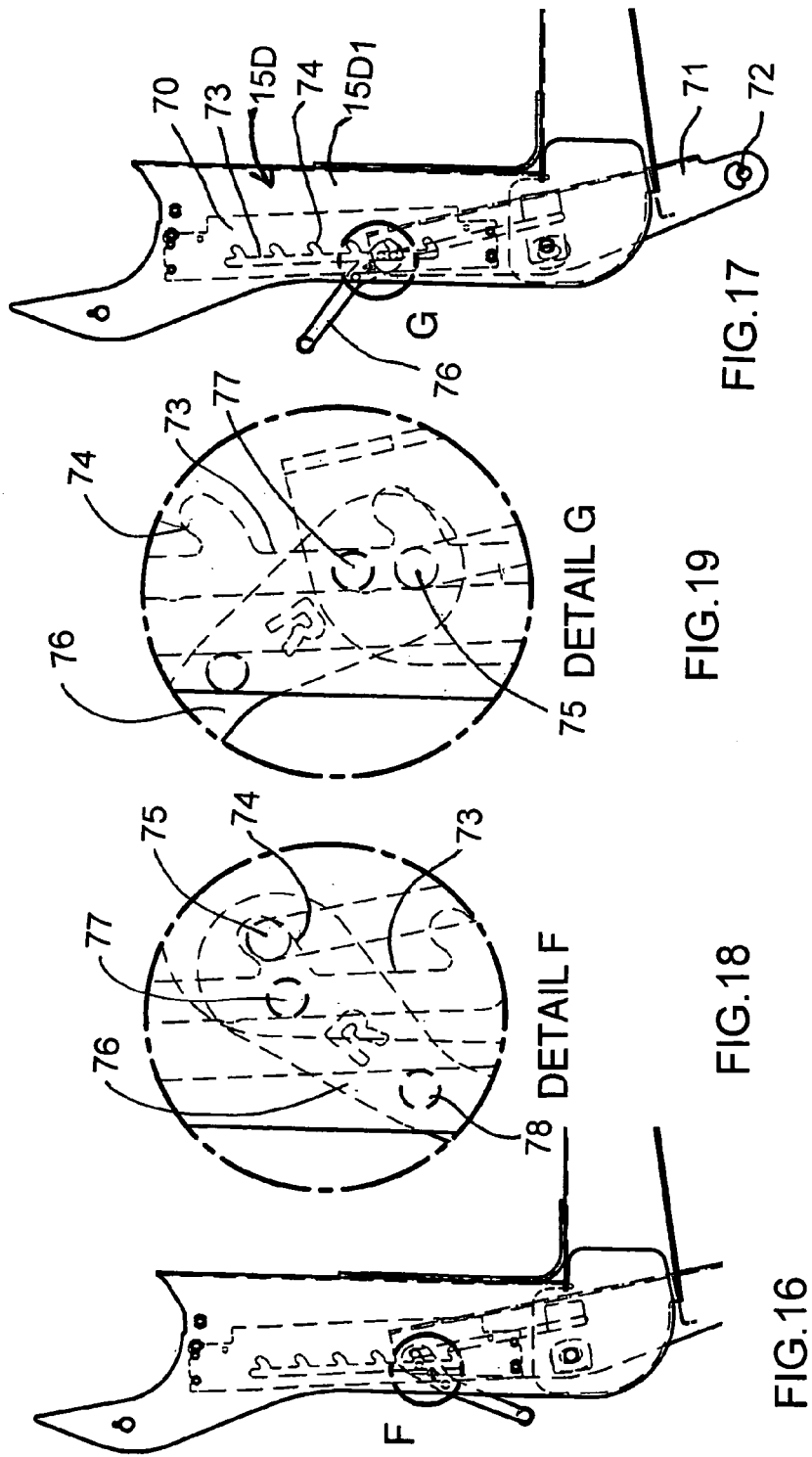

US 7,197,865 B1

SELF CONTAINED TRANSPORT FOR CROP HARVESTING HEADER

This application claim priority under 35 U.S.C. 119 of the filing date of Dec. 22$^{nd}$ 2005 of Provisional application Ser. No. 60/752,368.

This invention relates to a crop harvesting header including ground wheels by which the header can be trailed in a transport position.

BACKGROUND OF THE INVENTION

Crop harvesting headers generally include a main frame having a main rear structural member extending across a width of the header and a plurality of arms extending forwardly from the main rear structural member to a front edge of the header. At the front edge is mounted a cutter bar carrying a cutting knife so as to cut the standing crop at the forward edge and to allow that standing crop to fall or be directed onto a platform or other support rearward of the cutting knife.

The header generally includes a transport device in the form of an auger or a draper which then carries the cut crop across the header, that is at right angles to the forward direction to a collection area.

Such headers can be used with a combine harvester for supplying the material from a collection area into the feeder housing of the combine harvester or can be used with a swather for depositing the material from the collection area onto the ground in the form a swath.

Such headers can include additional elements such as conditioning rolls which act upon the crop material before or after its movement to the collection area. Such headers may or may not include a reel which can assist in handling the crop as it is cut and moved to the platform or other support area.

The present invention is concerned with the transportation of the header and is not intended to be limited to any particular type of header.

The present invention is particularly concerned with headers of the type which are attached onto a transport vehicle, which is a combine harvester or swather tractor. The vehicle supports the header from behind the main structural member so that the header is presented forwardly of the vehicle with its width transverse to the working direction of movement of the vehicle. The width of the header is necessarily relatively large to provide a wide cutting action and this width is normally larger then can be accommodated through gates or along roads.

One important problem of a header of this type is therefore to provide a transportation arrangement for the header by which it can be separated from the transport vehicle and towed in a direction generally at right angles to the working direction so that its width when towed is significantly reduced relative to the working width.

In U.S. Pat. No. 5,243,810 issued Sep. 14, 1993, of Fox et al assigned to the present assignees MacDon, there is disclosed an arrangement by which the header includes its own transportation wheels which can be rotated from a working position to a transport position so that the header can be separated from the transport vehicle and towed generally by the same transport vehicle in a direction at right angles to its working direction.

With this arrangement there is a single wheel at one end of the header and a tandem wheel arrangement at the opposite end of the header. The single wheel is rotated through 90° and carries a hitch pole which is attached to the towing vehicle. The towing vehicle therefore steers the single wheel at one end of the header. The tandem wheel arrangement initially provides an axle which is at right angles to the direction of working movement and provides two wheels spaced across the width of the header. When moved to the transport position, the axle is turned through 90° so that one wheel moves forwardly of the header to a position in front of the cutter bar so the axle can provide support for the cutter bar. The header is therefore supported in the transport position on the single front wheel and on the transverse rear axle and is towed by steering the front wheel with the hitch pole while the rear axle remains fixed. The single wheel and the tandem wheel arrangement in the working position of the header act as gauge wheels rolling upon the ground and holding the header at a required height relative to the ground.

This arrangement has achieved considerable success and is widely used on headers 30 feet in width and larger.

However in regard to smaller headers of the order of less than 30 feet, the axle arrangement can not be accommodated and therefore this arrangement is impractical for headers of this size.

An alternative arrangement for transporting a header of this type is to provide a separate trailer onto which the header is placed for towing behind the transport vehicle. However the trailer is inconvenient, relatively expensive and has the problem that it is generally in the wrong place when transport of the header is required.

Honey Bee of Saskatchewan, Canada, show in their brochure a header for attachment to a bidirectional tractor where the tractor is attached at a position adjacent one end of the header and additional ground wheel is provided on the header adjacent the opposed end. The header is moved to a transport position by rotating the header relative to the attachment of the tractor and by actuating the ground wheel to move to a support position underneath the header. The header can therefore be transported in a direction inclined at an angle of the order of 60° to its normal working direction thus reducing its width. In the transport position, therefore, the header is supported on the hitch of the tractor and upon the additional separate ground wheel. This arrangement is limited to an off-center mounting on the header and to a bidirectional tractor and therefore is unsuitable for more conventional arrangements.

AGCO in their brochure for their 600 header transport arrangement provide a ground wheel at one end of the header which is steered by the towing vehicle and an additional wheel at the opposed end of the header which moves from a folded position underneath the header outwardly to a position in front of the cutter bar. This arrangement does not support the header in a manner which is sufficiently stable.

In U.S. Pat. No. 5,970,695 issued Oct. 26th, 1999, of Dunn assigned to the present assignees MacDon, there is disclosed an arrangement where gauge wheels at the rear of the header are turned through 90 degrees and an additional separate wheel is added to the structure as a temporary attachment at the cutter bar.

In U.S. Pat. No. 6,209,297 issued Apr. 3rd, 2001 of Yeomans assigned to the Deere, there is disclosed an arrangement where, in transport, one wheel is mounted at the rear of the header and one is mounted at the cutter bar. The wheel at the cutter bar is carried on an arm which swings from a stored position inclined rearwardly to an operating position at the cutter bar. The wheels can be removed and stored during field operation or the wheels can be used as gauge wheels during field operation in which case the wheel from the cutter bar is removed from its mounting arm and attached at a different location on the rear of the header.

Examples of pull-type swathers are shown in U.S. Pat. No. 4,573,309 (Patterson), issued Sep. 15, 1987;—U.S. Pat. No. 3,279,158 (Kirkpatrick), issued Oct. 18, 1966;—U.S. Pat. No. 4,346,909 (Hundeby), issued Aug. 31, 1982;—U.S. Pat. No. 3,457,709 (Killbery), issued Jul. 29, 1969 and U.S. Pat. No. 4,460,193 (Dietz), issued Jul. 17, 1984. Further examples are shown in Canadian Patent 973,367 (International Harvester), issued Aug. 26, 1975, and in brochures issued by Co-op Implements and Versatile. In many of these arrangements an additional wheel is added to the header frame at a suitable location so that the header frame is supported on three ground wheels at spaced positions to form a stable structure. In the Versatile arrangement, the outside wheel can be a dual wheel system which rotates about a vertical axis directly between the wheels. The header frame is supported by a jack and a further wheel is added at the hitch end forward of the header frame to provide a stable trailer construction.

None of these arrangements provide an effective transportation system for a header through a self-propelled vehicle and none provide a suitable system for attachment of an additional ground wheel or for attachment of the necessary hitch.

SUMMARY OF THE INVENTION

It is one object of the invention to provide a header with an improved construction for supporting the header in a transport position and particularly which allows easy movement by the operator between the transport and working positions.

According to one aspect of the invention there is provided a header for a crop harvesting machine comprising:

a header frame having an elongate support structure arranged across a width of the header;

a mounting assembly attached to the header frame for releasably mounting the header frame on a vehicle in an operating position for movement across the ground carrying a crop to be harvested such that, when mounted on the vehicle, the header frame is supported on the vehicle in front of the vehicle for movement with the vehicle in a forward working direction transverse to the width of the header frame;

the header frame having a plurality of support arms mounted on the support structure and extending therefrom forwardly of the working direction;

a cutter bar extending across the width of the header having a cutter knife thereon for cutting a standing crop to be deposited into the header frame as the header is moved forwardly over the ground;

a feed member mounted on the header frame for carrying the deposited crop along the header frame for collection at a discharge area of the header frame;

a first wheel arrangement on the header frame adjacent a first end of the header frame for acting as a stabilizer when the header is in the operating position and movable to a transport position for transporting the header when removed from the vehicle in a transport direction generally longitudinal of the header frame and at a right angle to the working direction;

a second wheel arrangement on the header frame adjacent a second end of the header frame for acting as a stabilizer when the header is in the operating position and movable to a transport position for transporting the header when removed from the vehicle in the transport direction;

the first wheel arrangement being mounted on the header frame on the support structure at a rear end of a first one of the support arms;

the second wheel arrangement being mounted on the header frame on the support structure at a rear end of a second one of the support arms;

the first wheel arrangement being mounted on the header frame for rotation of a rolling direction of the first wheel arrangement between the working position, in which the rolling direction is along the working direction, through an angle of the order of 90 degrees, and the transport position, in which the rolling direction is along the transport direction;

the second wheel arrangement including a first wheel which is mounted on the header frame for rotation of a rolling direction of the first wheel arrangement between the working position, in which the rolling direction is along the working direction, through an angle of the order of 90 degrees, and the transport position, in which the rolling direction is along the transport direction;

the second wheel arrangement including a second wheel which is mounted on the header frame for movement between the working position, in which the second wheel is mounted on the header frame on the support structure at a rear end of one of the support arms, and the transport position, in which the second wheel is moved to a position adjacent the cutter bar so that the header is stably supported on the first wheel arrangement, the first wheel of the second wheel arrangement and the second wheel of the second wheel arrangement;

the first wheel and second wheel of the second wheel arrangement being mounted on the header frame for rotation of a rolling direction of the first wheel and the second wheel between the working position, in which the rolling direction is along the working direction, through an angle of the order of 90 degrees, and the transport position, in which the rolling direction is along the transport direction;

and a hitch arm for connection to the header so as to apply a pulling force to the header from a tractor;

the second wheel of the second wheel arrangement being mounted on a swing arm which pivots between the transport position and the operating position;

the first and second wheels of the second wheel arrangement including coupling members for connection together to operate as a common wheel arrangement in the operating position, the coupling members being releasable to allow the second wheel to move on the swing arm to the transport position at the cutter bar while the first wheel remains at the rear of said second one of the frame members.

Preferably the hitch arm is connected to the mounting member of the first wheel arrangement so as apply a pulling force to the header from a tractor through the mounting member of the first wheel arrangement and so as to effect a steering movement of the first wheel arrangement about the respective vertical axis.

Preferably the second wheel of the second wheel arrangement couples, in the transport position, to first wheel of the second wheel arrangement so as to move commonly relative to the header frame.

Preferably each of the first and second wheels is carried on its own axle and wherein there is provided a snap coupler for connecting the axles side by side for rotation of the first and second wheels about a common axis.

Preferably the first and second wheels are connected to provide common height adjustment thereof relative to the frame.

Preferably there is provided a height adjustment system for adjusting the height of the first wheel relative to the header frame, wherein the swing arm allows vertical movement of the second wheel in the working position and wherein there is provided a connection for attachment of the second wheel to the first wheel in the working position such that the second wheel can be moved to the adjusted height of the first wheel.

Preferably the swing arm is mounted so as to allow vertical movement of the second wheel in the working position.

Preferably the swing arm is mounted for pivotal movement about a generally vertical axis between the transport position and the operating position.

Preferably the swing arm includes a coupling for connection to the frame in the transport position so as to communicate loading to the frame.

Preferably the swing arm is mounted so as to provide guidance of the pivotal movement between the operating position and the transport position such that the swing arm is moved to the transport position while presenting the coupling at a correct height for attachment to the frame.

Preferably the coupling includes a tower extending upwardly from the swing arm to the frame on which the frame sits for transferring vertical loads from the frame onto the swing arm and a link arm extending from the swing arm along the frame to a connection to the frame.

Preferably the coupling is foldable into a collapsed position on the swing arm for the working position.

Preferably the coupling includes a coupling plate on the frame having a key-hole shaped slot therein defining a larger open end and a narrower slot end and wherein the coupling includes a coupling pin connected to the swing arm for engaging through the key-hole shaped slot, with an upper locating head arranged such that the locating head passes through the larger open end when the coupling pin is located at the larger open end and is held behind the coupling plate when the coupling pin is located at the narrower slot end, and wherein the coupling includes a spring mounted locking pin connected to the swing arm for locating in a hole in the coupling plate to locate the coupling pin at the narrower slot end of the slot.

Preferably there is provided a height adjustment mechanism for adjusting the height of the first wheel of the second wheel arrangement relative to the frame comprising:

a first portion attached to either the frame or the first wheel and a second portion attached to the other of the first wheel and the frame;

the first portion including a generally vertical guide slot and a plurality of locating receptacles at spaced positions along the guide slot;

the second portion including a locating bar which is mounted in the guide slot so as to be slidable along the guide slot so as to adjust the height of the first portion relative to the second portion, the locating bar being movable into a selected one of the locating receptacles when a height has been selected so as to hold the locating bar against movement along the guide slot;

and a manually operable handle to which the locating bar is attached which is pivotally movable between a locked position and an adjust position so as to move the locating bar between the selected receptacle and the guide slot.

Preferably the manually operable handle carries a second bar parallel to the locating bar wherein the second bar and the locating bar are movable by the pivotal movement of the locking handle between the locked position and the adjust position such that in the locked position the locating bar is in the receptacle and is held therein by the second bar in the guide slot and such that in the adjust position the locating bar and the second bar are both in the guide slot allowing sliding movement of both along the guide slot.

Preferably the guide slot and receptacles are defined by a member having two parallel side walls with each side wall having a slot and receptacles formed therein and wherein the locating bar spans the two side walls.

It is a second object of the invention to provide a header with an improved construction for supporting the header in a transport position and particularly which allows easy movement by the operator between the transport and working positions.

According to a second aspect of the invention there is provided a header for a crop harvesting machine comprising:

a header frame having an elongate support structure arranged across a width of the header;

a mounting assembly attached to the header frame for releasably mounting the header frame on a vehicle in an operating position for movement across the ground carrying a crop to be harvested such that, when mounted on the vehicle, the header frame is supported on the vehicle in front of the vehicle for movement with the vehicle in a forward working direction transverse to the width of the header frame;

the header frame having a plurality of support arms mounted on the support structure and extending therefrom forwardly of the working direction;

a cutter bar extending across the width of the header having a cutter knife thereon for cutting a standing crop to be deposited into the header frame as the header is moved forwardly over the ground;

a feed member mounted on the header frame for carrying the deposited crop along the header frame for collection at a discharge area of the header frame;

at least one wheel arrangement mounted on the header frame for rotation of a rolling direction of the wheel arrangement between the working position, in which the rolling direction is along the working direction, through an angle of the order of 90 degrees, and the transport position, in which the rolling direction is along the transport direction;

and a hitch arm for connection to the header so as to apply a pulling force to the header from a tractor;

said at least one wheel arrangement including a wheel mounted on a swing arm which pivots between the transport position in which said wheel is mounted on the header frame at a rear end of one of the support arms, and the transport position, in which the wheel is moved to a position adjacent the cutter bar;

wherein the swing arm includes a coupling for connection to the frame in the transport position so as to communicate loading to the frame;

and wherein the swing arm is mounted so as to provide guidance of the pivotal movement between the operating position and the transport position such that the swing arm is moved to the transport position while presenting the coupling at a correct height for attachment to the frame.

In this arrangement, preferably the coupling includes a tower extending upwardly from the swing arm to the frame on which the frame sits for transferring vertical loads from the frame onto the swing arm and a link arm extending from the swing arm along the frame to a connection to the frame.

In this arrangement, preferably the coupling is foldable into a collapsed position on the swing arm for the working position.

It is yet another object of the invention to provide a header with an improved construction for supporting the header in a transport position and particularly which allows easy adjustment of the height of at least one of the wheels in the operating position.

According to a third aspect of the invention there is provided a header for a crop harvesting machine comprising:

a header frame having an elongate support structure arranged across a width of the header;

a mounting assembly attached to the header frame for releasably mounting the header frame on a vehicle in an operating position for movement across the ground carrying a crop to be harvested such that, when mounted on the vehicle, the header frame is supported on the vehicle in front of the vehicle for movement with the vehicle in a forward working direction transverse to the width of the header frame;

the header frame having a plurality of support arms mounted on the support structure and extending therefrom forwardly of the working direction;

a cutter bar extending across the width of the header having a cutter knife thereon for cutting a standing crop to be deposited into the header frame as the header is moved forwardly over the ground;

a feed member mounted on the header frame for carrying the deposited crop along the header frame for collection at a discharge area of the header frame;

at least one wheel mounted on the header frame for rotation of a rolling direction of the wheel between the working position, in which the rolling direction is along the working direction, through an angle of the order of 90 degrees, and the transport position, in which the rolling direction is along the transport direction;

a hitch arm for connection to the header so as to apply a pulling force to the header from a tractor;

and a height adjustment mechanism for adjusting the height of the wheel relative to the frame comprising:

a first portion attached to either the frame or the wheel and a second portion attached to the other of the first wheel and the frame;

the first portion including a generally vertical guide slot and a plurality of locating receptacles at spaced positions along the guide slot;

the second portion including a locating bar which is mounted in the guide slot so as to be slidable along the guide slot so as to adjust the height of the first portion relative to the second portion, the locating bar being movable into a selected one of the locating receptacles when a height has been selected so as to hold the locating bar against movement along the guide slot;

and a manually operable handle to which the locating bar is attached which is pivotally movable between a locked position and an adjust position so as to move the locating bar between the selected receptacle and the guide slot.

In this arrangement, preferably the manually operable handle carries a second bar parallel to the locating bar wherein the second bar and the locating bar are movable by the pivotal movement of the locking handle between the locked position and the adjust position such that in the locked position the locating bar is in the receptacle and is held therein by the second bar in the guide slot and such that in the adjust position the locating bar and the second bar are both in the guide slot allowing sliding movement of both along the guide slot.

In this arrangement, preferably the guide slot and receptacles are defined by a member having two parallel side walls with each side wall having a slot and receptacles formed therein and wherein the locating bar spans the two side walls.

BRIEF DESCRIPTION OF THE DRAWINGS

One embodiment of the invention will now be described in conjunction with the accompanying drawings in which:

FIG. 10 is a rear elevational view of the components shown in FIG. 3 showing the wheels in the harvesting position.

FIG. 11 is a cross-sectional view along the lines 11—11 of FIG. 10 showing the wheels in the harvesting position.

FIG. 12 is a rear elevational view of a part only of the components shown in FIG. 11 on an enlarged scale showing one detail.

FIG. 13 is a top plan view of a part only of the components shown in FIG. 10 on an enlarged scale showing one detail.

FIG. 14 is a front elevational view of the locking mechanism only for holding the wheel shown in FIG. 4 in the transport position.

FIG. 15 is a bottom plan view of the locking mechanism of FIG. 14.

FIG. 16 is a side elevational view of the wheel height adjustment mechanism only for the wheel as shown in FIGS. 10 and 11, shown in a set position of the wheel.

FIG. 17 is a side elevational view similar to that of FIG. 16, shown in an adjustment position of the wheel.

FIG. 18 is a side elevational view of the wheel height adjustment mechanism as shown in FIG. 16 on an enlarged scale showing one detail.

FIG. 19 is a side elevational view of the wheel height adjustment mechanism as shown in FIG. 17 on an enlarged scale showing one detail.

In the drawings like characters of reference indicate corresponding parts in the different figures.

DETAILED DESCRIPTION

Figure 1:
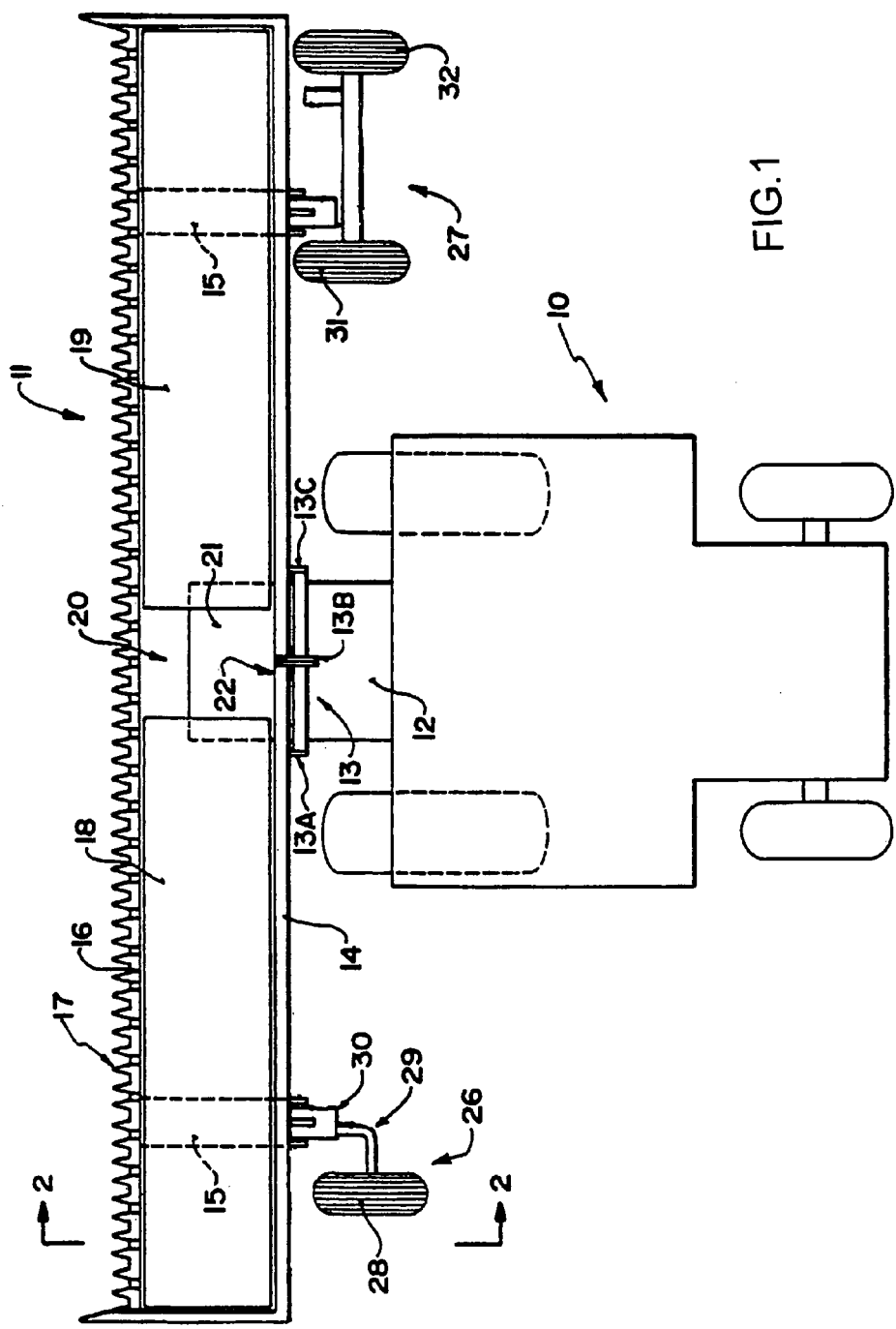
FIG. 1 is a top plan view of a header according to the present invention showing in schematic manner only the layout of the frame, cutter bar and drapers attached to a harvesting vehicle for transport of the header in a harvesting action.

Reference is made to U.S. Pat. Nos. 5,005,343 and 5,243,810 of the present assignees which show some detail of the header on which the design of the present embodiment is based. That header is generally used in conjunction with a conventional combine harvester generally indicated at 10 with a header indicated at 11.

The conventional combine harvester is shown only schematically and includes a feeder housing 12 through which the crop from the header is intended to pass into the main body of the combine harvester. The feeder housing includes a front mounting section 13 shown only schematically which is coupled to the header to provide support of the header for movement across the ground.

Most conventional headers are rigidly coupled to the front of the feeder housing so as to remain at the predetermined orientation directly across the front of the combine harvester. The present header is however mounted in a manner including a linkage including as shown three links 13A, 13B and 13C or four links which allow some pivotal movement of the header to occur about a horizontal axis extending forwardly along the line of intended working direction of the combine harvester.

The header conventionally comprises a main frame tube 14 extending along the full length of the header which acts as the main backbone providing rigidity to the header. The frame further includes a plurality of generally L-shaped frame members 15 which extend vertically downwardly from the tube 14 and then have a leg section extending forwardly from a lower end of the vertical portion. At the forward end of the L-shaped leg sections is provided a flange 16 on which is mounted a conventional sickle knife 17 for cutting the standing crop. The standing crop is transported inwardly of the header by a pair of side drapers 18 and 19 which provide an upper run of the canvas extending from the outside end of the header inwardly toward a central section generally indicated at 20. At the central section is provided a feed draper 21 which moves the crop which has been fed to the center section rearwardly through an opening 22 at the feeder housing. A rotating confining and feeding member 23 is provided at the feeder housing to assist in directing the material downwardly and rearwardly into the feeder housing for proper supply to the combine harvester. A reel 24 is mounted on reel arms 25 supported from the tube 14 in conventional manner.

All of the above features are shown and described in the above mentioned US patents and further details can be obtained from study of these patents. For convenience of illustration the reel and the confining member are omitted from FIGS. 1 and 3 and the reel and the draper are omitted from FIG. 5.

Figure 2:
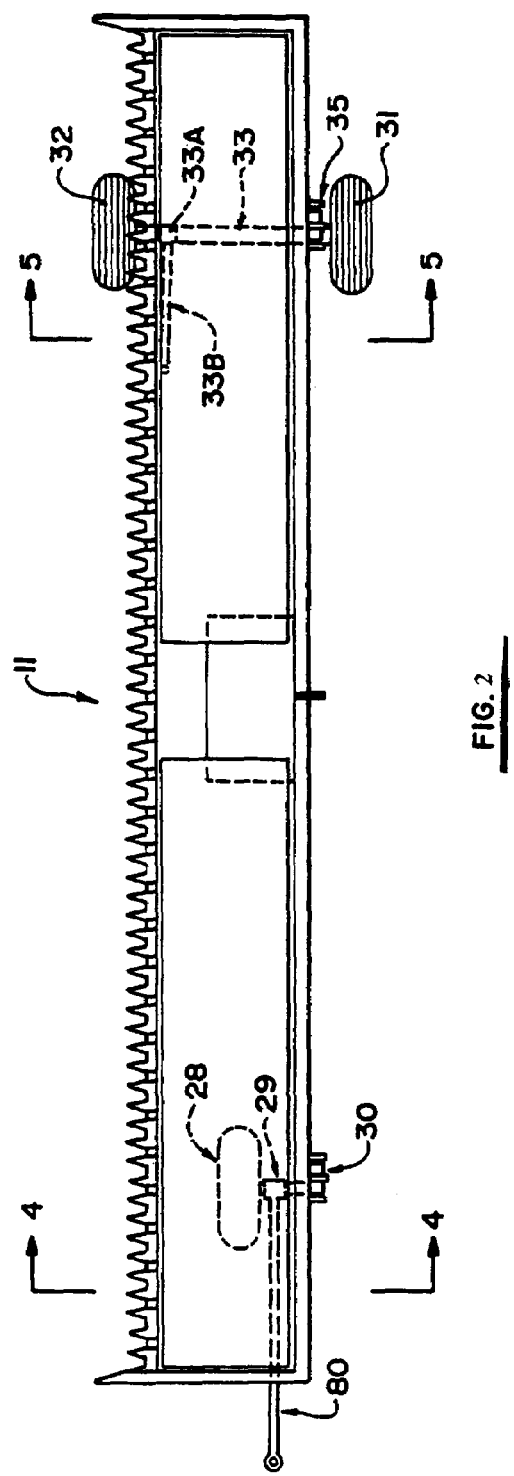
FIG. 2 is a top plan view of a header according to the present invention showing in schematic manner only the header of FIG. 1 arranged for towing by the harvesting vehicle.

The previous machine of the present assignees also includes a pair of gauge wheels mounted on the rear part of the L-shaped frames 15 so as to project rearwardly from the frame in a manner similar to that shown in FIG. 2. However in the previous machine the gauge wheels are simply provided to act as gauge wheels and are spring loaded into engagement with the ground. In the transportation of the machine previously manufactured, the header is simply mounted on a separate trailer in conventional manner whereupon the gauge wheels do not in any way assist in the transportation process.

The machine as shown herein however is modified so that the gauge wheels can also be used for the transportation of the header when disconnected from the combine harvester.

The gauge wheels therefore comprises a lefthand gauge wheel system generally indicated at 26 and a righthand gauge wheel system generally indicated at 27. The gauge wheel system 26 includes a pair of gauge wheels 28 mounted upon an arm 29 carried upon a bracket 30 pivotally connected to the rear part of the frame 15. The righthand gauge wheel system includes a pair of ground wheels 31 and 32.

Figure 3:
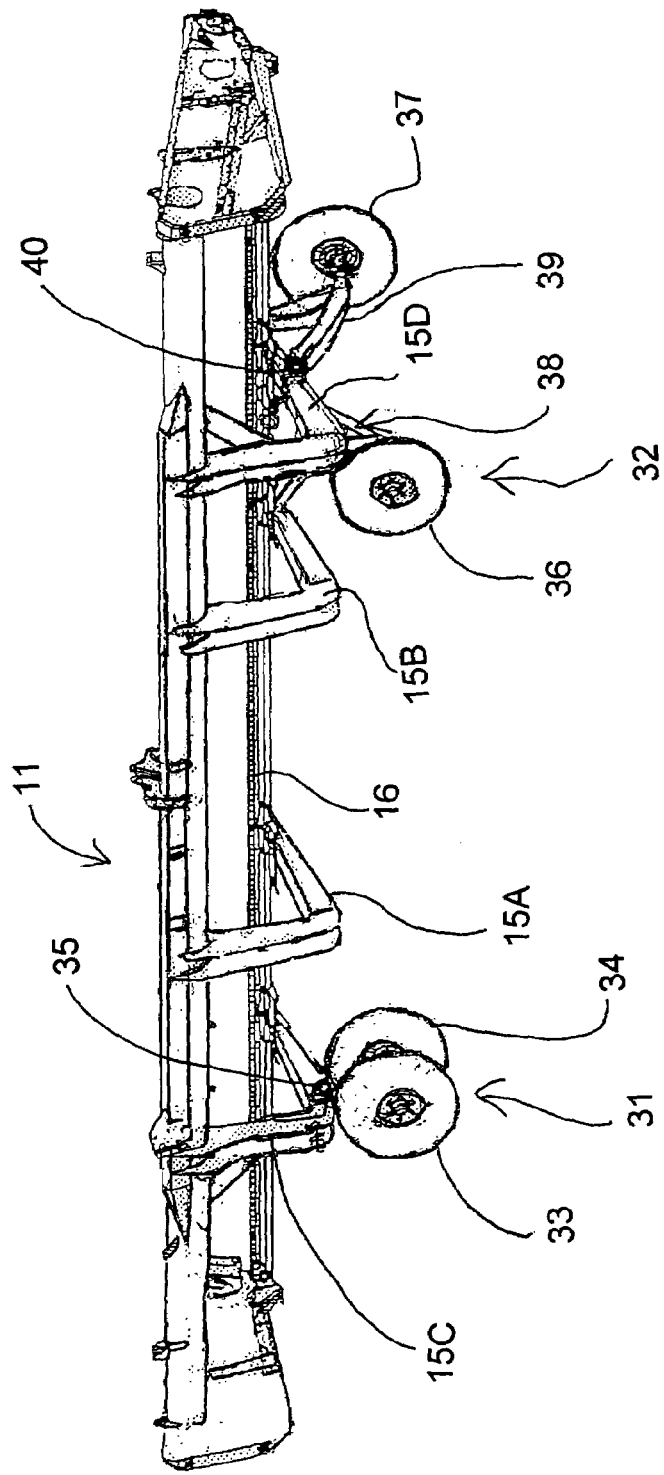
FIG. 3 is an isometric view of a header according to the present invention showing the header in more detail but where the support wheels and frame only are shown, thus omitting for convenience of illustration the cutting knife, drapers and crop guide panels, the support wheels being arranged in the position for towed transport.

In FIG. 3 the system according to the present invention is shown generally which includes the header 11 including the frame members previously described. Thus the frame members include inner frame members 15A and 15B which are arranged for attachment to the support structure of the transport vehicle. The frame members further include outer frame members 15C and 15D which are arranged to be attached to the ground wheels generally indicated in this embodiment at 31 and 32. The ground wheel assembly 31 includes two side by side wheels 33 and 34 which are connected to a common support system 35 which carried the ground wheels on the frame member 15C for height adjustment of the wheels relative to the frame member 15C for use in the operating position in the field. Also the mounting assembly 35 carries the pair of wheels 33 and 34 so that they can be rotated from the operating position parallel to the working direction and to the transport position shown in FIG. 3 which is at right angles to the transport position.

The wheel assembly 32 includes a first wheel 36 and a second wheel 37. The first wheel 36 is mounted on a first assembly 38 which carries that wheel in an arrangement which provides height adjustment for the working position and which also provides rotation about the vertical axis to move from the operating position to the transport position.

The wheel 37 is however separate from the wheel 36 in that it is mounted on a swing arm 39 which pivots about a mounting 40 allowing the wheel to move from the operating position to the transport position. In the operating position the wheel 37 is located immediately adjacent the wheel 36 and is connected to that wheel. In the transport position the wheel 37 is moved on the swing arm 39 to the front of the header underlying the cutter bar 16. Thus the second wheel in the transport position is moved so that it provides support for the header on the opposite side of the center of gravity relative the wheel 36 so that, as previously described, the header can be towed longitudinally by a hitch pole connected to the wheel assembly 31.

Figure 5:
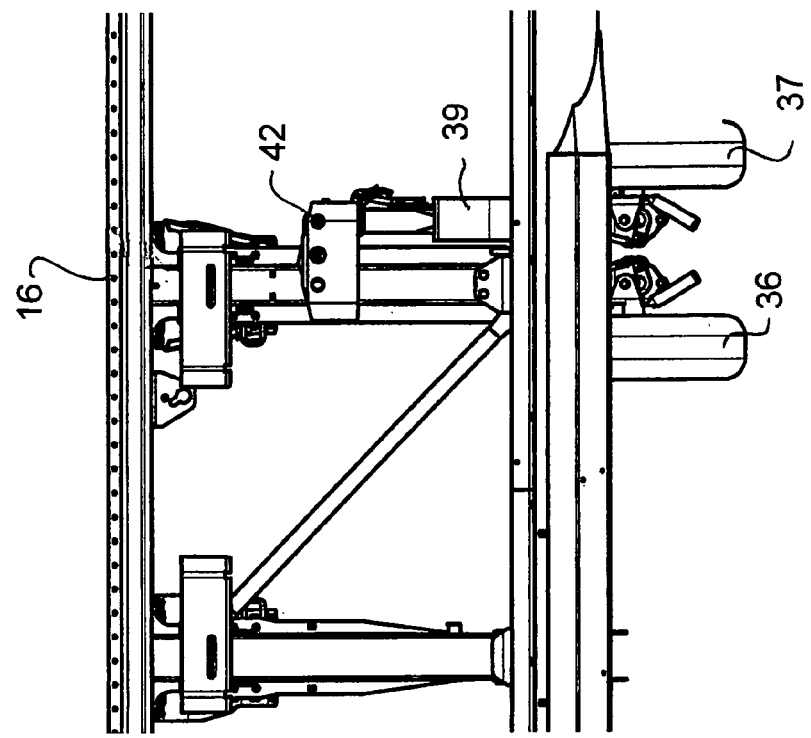
FIG. 5 is a top plan view of the components shown in FIG. 3 showing the wheels in the harvesting position.
Figure 4:
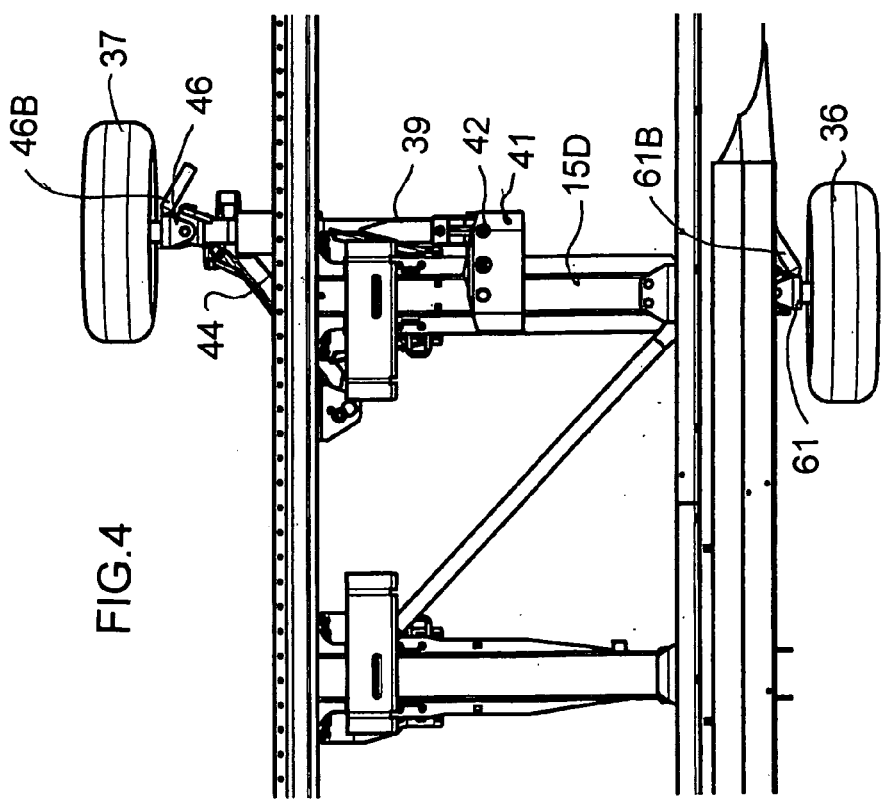
FIG. 4 is a top plan view of that part only of the header of FIG. 3 showing the wheels at what is the rear end of the header in the towed position.
Figure 7:
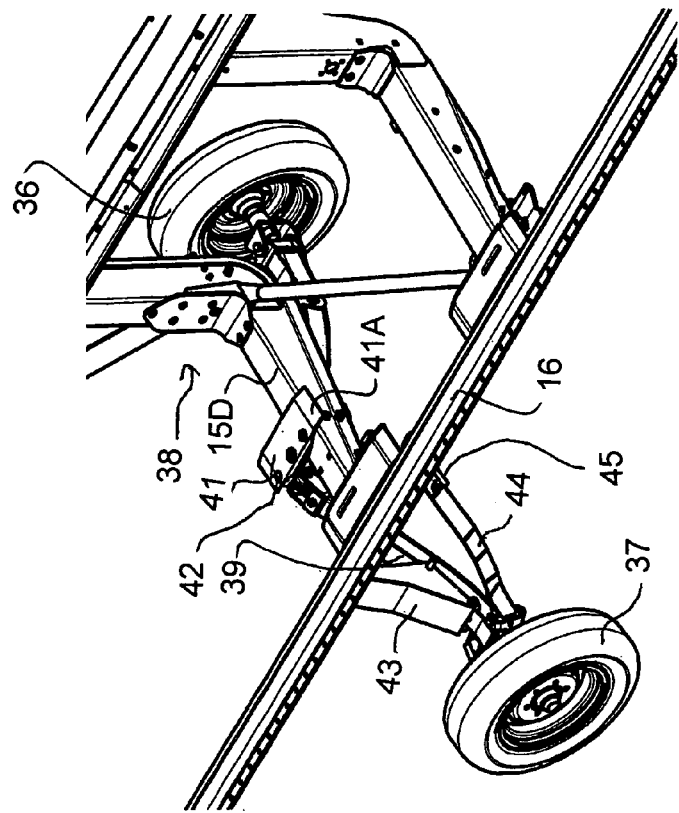
FIG. 7 is an isometric view of the components shown in FIG. 3 showing the wheels in the towed position.
Figure 6:
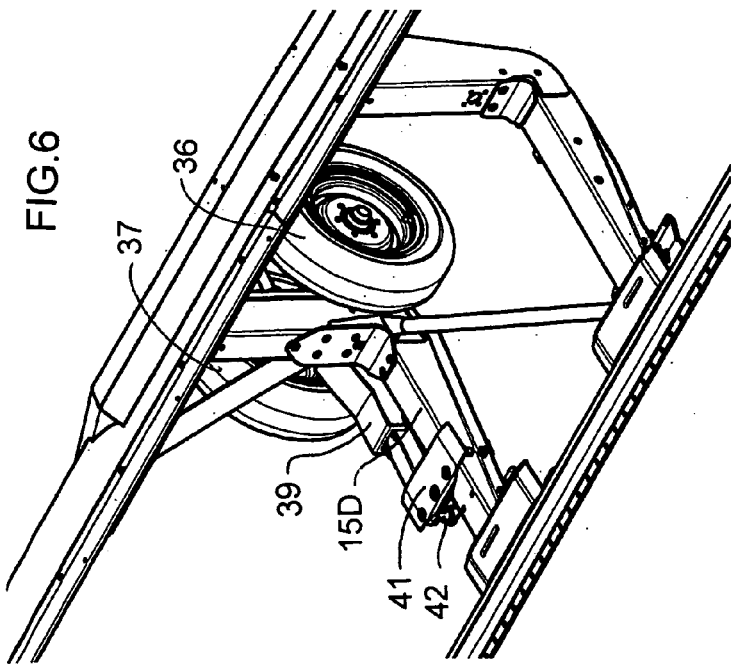
FIG. 6 is an isometric view of the components shown in FIG. 3 showing the wheels in the harvesting position.

Turning now to FIGS. 4, 5, 6 and 7, further detail of the wheel assembly 32 is shown. The swing arm 39 is mounted on the frame member 15D by a bracket 41. The bracket is attached at one end 41A to the frame member 15D and extends outwardly to one side of the frame member 15D. The bracket 41 thus provides a pivot 42 for the swing arm at a vertical pivot axis located along side the frame member 15D. This allows the swing arm to swing about the generally vertical axis defined by the pivot 42 from a position at right angles to the cutter bar 16 from the position at the rear of the frame to the position at the front of the frame. The position at the front of the frame is the transport position and is shown in FIGS. 4 and 7 and the position at the rear of the frame is the operating position shown in FIGS. 5 and 6. The bracket 41 and the pivot 44 are arranged so that in the operating position as best shown in FIG. 6 swing arm 39 can move upwardly and downwardly about a generally horizontal axis through the bracket 41 allowing the wheel 37 upwardly and downwardly in an adjusting action. The pivot 42 thus is basically a vertical pivot but also provides some freedom to move about the transverse horizontal axis.

The bracket 41 and the pivot 42 is further arranged so that as the swing arm moves from the working position towards the transport position the ability of the swing arm to move upwardly and downwardly is reduced or removed so that the height of the swing arm is fixed as it moves towards the cutter bar 16. Thus at the cutter the swing arm approaches the cutter bar at a specified height relative to the cutter bar so that the swing arm is presented at the required height for it proper engagement with the cutter as described hereinafter.

Thus in use when the operator wishes to transfer the wheel assembly 32 from the operating position to the transport position, the operator raises the frame from the ground so that the wheels are free of the ground thus allowing the wheel 37 to be free and to be moved on the swing arm around the pivot 42. At the working position the swing arm is located by the pivot 42 so that it is raised from the ground but a lowermost position of the adjustment system described hereinafter. The operator is thus free to push manually the wheel 37 and the swing arm around the axis of the pivot 42 toward the transport position shown in FIG. 7 and the swing arm and the wheel 37 thus pivot freely to the transport position requiring little effort until the swing arm reaches the position at right angles to the cutter bar 16 which is the transport position.

In order to obtain this required height of the swing arm in the transport position, the bracket 41 includes a cam surface which engaged an underside of the swing arm to locate the swing arm as it moves around the pivot 42.

Swing arm 39 includes a tower portion 43 which extends upwardly from the swing arm to engage the underside of the cutter bar 16 so that the cutter bar can rest on the tower portion 43 and apply force through the tower portion 43 to the swing arm. The swing arm further includes a brace 44 which extends from the outer end of the swing arm forwardly and inwardly toward to the opposite wheel 36 as shown in the transport position in FIG. 7 so that the brace 44 extends from the end of the swing end forwardly and inwardly to a forward end 45 which is attached to the cutter bar 16.

Figure 9:
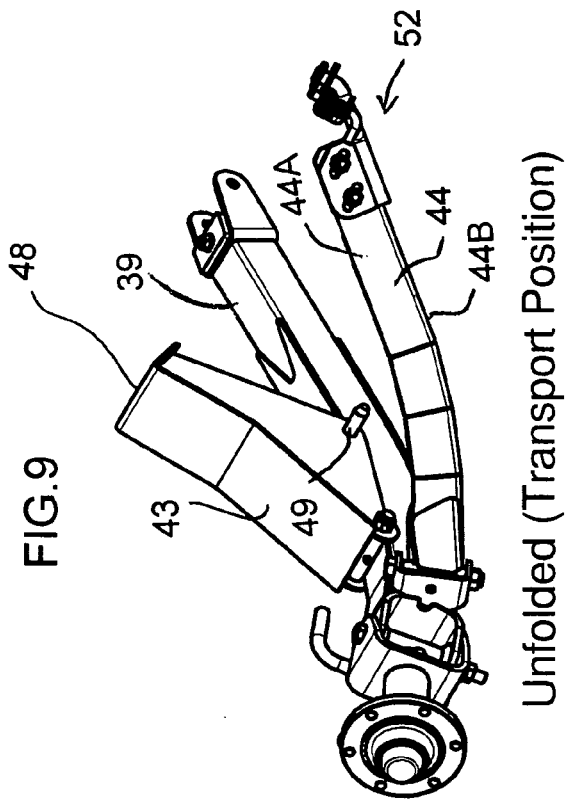
FIG. 9 is an isometric view of the swing arm portion only of the components shown in FIG. 3 swing arm in the towed position.
Figure 8:
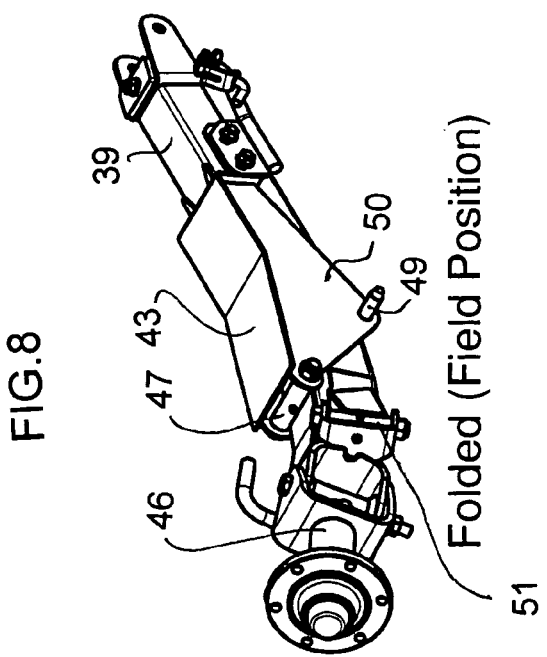
FIG. 8 is an isometric view of the swing arm portion only of the components shown in FIG. 3 swing arm in the harvesting position.

The construction of the swing arm 39 and the tower 43 together with the brace 44 is best shown in FIGS. 8 and 9. In this figure it will be noted that the outer end of the swing arm carries a hub 46 to which the wheel 37 is attached. The tower 43 can be moved to a folded position shown in FIG. 8 by pivotal movement about a mounting bracket 47 attached to the top of the swing arm 39. Thus the tower 43 can be moved from its folded position shown in FIG. 8 and pivoted upwardly to a position at which an upper end 48 of the tower can engage against a suitable undersurface of the cutter 16. A pin 49 is provided on the tower which can be engaged into position on top of the swing arms 39 to hold the tower against collapse when in the unfolded position so that it provides a rigid support fixed relative to the swing arm to transfer loads from the weight of the frame and the cutter bar 16 through the tower into the swing arm. The tower 43 includes two side walls 50 which are triangular in shape so that the pin 49 engages underneath the swing am in the folded position and engages on top of the swing arm in the raised position. The brace 44 is mounted on one side of the swing arm on a pivot bracket 51 so that pivot out from the folded position in which it lies along side the swing arm as shown in FIG. 8 to the extended position shown in FIG. 9. The brace 44 is formed as an angle member with an upstanding flange 44A and a underlying flange 44B. At the forward end of the brace is provided a coupling 52 described in more detail hereinafter. In the folded position the brace has its upstanding flange 44A lying along one side wall of the swing arms 39 and that flange is located between the side wall 50 of the tower and the side wall of the swing arm so that it is retained in place along side the swing arm after the tower is folded down on the outside of the upstanding flange 44A of the brace 44. The bottom flange 44B of the brace engages underneath the bottom surface of the swing arm and is again trapped in place by the pin 49 which extends underneath the bottom flange 44B and underneath the bottom surface of the swing arm so as to hold the brace in place when the tower 43 is folded down and locked in placed by the pin 49.

Thus when the operator has moved the swing arm from the operating position to the transport position, the tower 43 and the brace 44 can simply be expanded into position and because the swing arm is at the right height, the tower engages up under the cutter bar to the required height without necessity for adjustment and the brace moves to the required position so that the coupling 52 at the forward end can be attached to the underside of the cutter bar as described in detail hereinafter.

The coupling 52 is shown in more detail in FIGS. 14 and 15. The coupling 52 co-operates with a plate 53 attached to the underside of the cutter bar 16. The plate 53 has a key hole opening 54 with a wider end 54A and a narrower end 54B. The coupling 52 further includes a pin 55 which extends from the end of the brace 44 to a bearing member 56 which can project through the key hole slot 54. The bearing member has a size such that it can engage through the larger end 54A of the slot 54 but when moved into the narrower end 54B is located above the plate 53 so as to hold the forward end of the rod 55 against the underside of the plate 53.

In order to hold the bearing member 56 at the required position at the narrower end of the slot 54B, there is provided a spring pin 57 of a conventional nature which can pop into a hole 58 provided in the plate 53. Thus the pin 57 merely acts to located the rod 55 and the bearing member 56 at the required position on the plate 53 so that the bearing remains in position at the narrower end 54B. The loading from the brace is thus transferred from the plate 53 to the bearing member 56 and the pin 57 receives little loading. When the pins 57 is pulled against its spring mounting and retracted from the hole 58 the bearing member 56 can simply slide to the larger end 54A of the slot and thus can be removed from the slot 54 allowing the coupling 52 to be disconnected from the plate 53.

This arrangement therefore provides a simple mounting of a load bearing member 56 in a way which can communicate forces between the load bearing member and the plate 53 while the bearing member can be simply and easily removed from its position simply by the operator pulling the pin 57.

Turning now to FIGS. 11 and 12, the wheels 36 and 37 are shown in the working position of FIG. 5. In this position the wheels have a coupling 60 which connects the wheels together for co-operation. The hub 46 of the wheel 37 is thus connected to a hub 61 of the wheel 36. This coupling 60 is effected by a pin and receptacle arrangement best shown in FIGS. 12 and 13 where there is provided a pin 62 which engages into a receptacle 63 and is latched in place to hold the hubs in parallel arrangement with the height of the hubs aligned.

Each hub 46 and 61 can rotate relative to its mounting about a generally vertical pivot member indicated at 46A and 61A respectively. This allows the hub to rotate through 90 degrees from the working position shown in FIG. 10 and FIG. 5 to the transport position best shown in FIG. 4. The hub carries a manually graspable handle including a handle 46B on the hub 46 and a handle 61B on the hub 61. The hubs are locked in place at the required orientation by a respective spring pin 46C and 61C carried on the respective hub 46, 61. The spring pin can be manually pulled from a locking position in which a lower end of the pin engages through plates on the hub and mounting the hub so that the locating hole on the hub is aligned with respective holes in the mounting plate for the hub and the pin engaged into the selected hole for required orientation of the hub and therefore of the respective wheel.

The wheel 36 and the hub 61 are connected to a height adjustment mechanism generally indicated at 65. This mechanism is shown in more detail in FIGS. 16 through 19. In general the height adjustment mechanism 65 is mounted on the frame member 15D and allows the height of the hub 61 to be adjusted relative to the rear end of the frame member 15D so as to adjust the working height of the wheel 36 relative to the frame. The height adjustment mechanism 65 is connected only to the hub 61 so that it is free of the hub 46 and its wheel 37.

In general, in operation therefore, with the hub 46 disconnected from the hub 61 and free to swing on its swing arm 39, the height of the wheel 36 and the hub 61 attached thereto is adjusted by operating the height adjustment mechanism 65 as described hereinafter. As only a single wheel 36 is being adjusted at this time, the weight of the wheel is relatively low and can be lifted and lowered manually to the required height and the adjustment mechanism 65 operated to locate the wheel and the hub at that selected height. A spring assist 68 is provided for taking a part of the weight of the wheels 36 and its hub 61 so that the operator requires only to lift that part of the weight which is unsupported by the spring assist. A suitable arrangement for the spring assist will be apparent to a person skilled in the art which provides a connection between the hub 61 or an element connected to the hub relative to the frame so as to lift the hub 61 and provide partial support for the hub.

In general, after the wheel 36 and its hub 61 have been adjusted to the required height and located by the height adjustment mechanism 65, the wheel 37 and its hub 46 is moved into position along side the hub 61 and the latching mechanism 60 operated to locate the wheel 37 and the hub 46 in position along side the hub 61. When connected in this way the two wheels are connected together at the selected height and thus remain fixed to the frame to provide a gauging action between the frame and the ground.

The height adjustment mechanism is shown in more detail in FIGS. 16 through 19. The height adjusting mechanism 65 includes a track 70 carried in the frame member 15D in the vertical section of that frame member as indicated at 15D1 together with a lift arm 71 which extends downwardly to the hub 61 and is attached thereto to raise and lower the hub. The lower end of the lift arm 71 is connected by a transverse pin 72 to the hub at a suitable location thereon. The lift arm 71 includes two parallel sides and a transverse joining web to form a channel member which slides inside two side walls of the track 70. The track 70 defined by the two side walls which are attached inside the vertical portion 15D1 include a vertical track portion 73 and a series of receptacle portions 74 at spaced positions along the vertical track portion 73. The side walls of the lift arm 71 include a transverse pin 75 which connects the side walls. As shown in FIG. 18, the pin 75 in a locked position of the height adjustment mechanism 65 is engaged into a selected one of the recesses 74 from the track 73. When the pin 75 is locked in position within the receptacle 74, the pin 75 cannot move vertically upwardly or downwardly relative to the track 70 since the pin is fixed in position in the selected receptacle 74. The receptacle 74 as best shown in FIG. 18 in order that weight applied downwardly from the frame member 15D through the track 70 is applied downwardly onto the pin 75 thus tending to push the pin 75 further into the upwardly curved track receptacle 74 so that weight tends to maintain the system in the fixed position.

When the pin 75 is moved out of the receptacle 74 into the vertical track portion 73, the pin 75 can move upwardly and downwardly on the track portion 73 as shown in FIG. 3.

The pin 75 is attached to the lift arm 71 by a lever 76. The lever 76 carries a second pin 77 which extends transversely across the track 70 along side the pin 75 but spaced from the pin 75. A comparison of the positions shown in FIGS. 18 and 19 will show that the lever 76 in the locked position of FIG. 18 is moved manually downwardly to a position in which the pin 77 is located in the track portion 73 and the pin 75 is forced into the receptacle 74. If the lever 76 is moved upwardly to the position shown in FIGS. 17 and 19, the pivotal movement of the lever 76 about the pin 77 acts to pull the pin 75 out of the receptacle 74 to a position in which the pins 77 and 75 are aligned in the track portion 73. In this position both pins are in the track set portion 73 and both pins can slide upwardly and downwardly within the track portion until the pin 75 reaches the selected receptacle 74. When the pin 75 is at the required height as adjusted by the operator, the operator can manually move the lever 76 downwardly thus pivoting the lever about the pin 77 and forcing the pin 75 into the selected receptacle 74.

In this way the operator can simply lift the lever 76 to the slide position shown in FIGS. 17 and 19, can move the wheel upwardly and downwardly as assisted by the spring 68 until the selected position is achieved whereupon the lever 76 is moved downwardly to lock the pin 75 in the required receptacle. A further transverse locking pin 78 can be manually inserted in place across the lever 76 as shown in FIGS. 16 and 18 so as to ensure that the lever is fixed in its downward locked position thus holding the pin in 75 in place in the receptacle 74 and preventing inadvertent release of the pin 75 by inadvertent pivoting of the lever 76.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A header for a crop harvesting machine comprising:
   a header frame having an elongate support structure arranged across a width of the header;
   a mounting assembly attached to the header frame for releasably mounting the header frame on a vehicle in an operating position for movement across the ground carrying a crop to be harvested such that, when mounted on the vehicle, the header frame is supported on the vehicle in front of the vehicle for movement with the vehicle in a forward working direction transverse to the width of the header frame;
   the header frame having a plurality of support arms mounted on the support structure and extending therefrom forwardly of the working direction;
   a cutter bar extending across the width of the header having a cutter knife thereon for cutting a standing crop to be deposited into the header frame as the header is moved forwardly over the ground;
   a feed member mounted on the header frame for carrying the deposited crop along the header frame for collection at a discharge area of the header frame;

a first wheel arrangement on the header frame adjacent a first end of the header frame for acting as a stabilizer when the header is in the operating position and movable to a transport position for transporting the header when removed from the vehicle in a transport direction generally longitudinal of the header frame and at a right angle to the working direction;

a second wheel arrangement on the header frame adjacent a second end of the header frame for acting as a stabilizer when the header is in the operating position and movable to a transport position for transporting the header when removed from the vehicle in the transport direction;

the first wheel arrangement being mounted on the header frame on the support structure at a rear end of a first one of the support arms;

the second wheel arrangement being mounted on the header frame on the support structure at a rear end of a second one of the support arms;

the first wheel arrangement being mounted on the header frame for rotation of a rolling direction of the first wheel arrangement between the working position, in which the rolling direction is along the working direction, through an angle of the order of 90 degrees, and the transport position, in which the rolling direction is along the transport direction;

the second wheel arrangement including a first wheel which is mounted on the header frame for rotation of a rolling direction of the first wheel arrangement between the working position, in which the rolling direction is along the working direction, through an angle of the order of 90 degrees, and the transport position, in which the rolling direction is along the transport direction;

the second wheel arrangement including a second wheel which is mounted on the header frame for movement between the working position, in which the second wheel is mounted on the header frame on the support structure at a rear end of one of the support arms, and the transport position, in which the second wheel is moved to a position adjacent the cutter bar so that the header is stably supported on the first wheel arrangement, the first wheel of the second wheel arrangement and the second wheel of the second wheel arrangement;

the first wheel and second wheel of the second wheel arrangement being mounted on the header frame for rotation of a rolling direction of the first wheel and the second wheel between the working position, in which the rolling direction is along the working direction, through an angle of the order of 90 degrees, and the transport position, in which the rolling direction is along the transport direction;

and a hitch arm for connection to the header so as to apply a pulling force to the header from a tractor;

the second wheel of the second wheel arrangement being mounted on a swing arm which pivots between the transport position and the operating position;

the first and second wheels of the second wheel arrangement including coupling members for connection together to operate as a common wheel arrangement in the operating position, the coupling members being releasable to allow the second wheel to move on the swing arm to the transport position at the cutter bar while the first wheel remains at the rear of said second one of the frame members.

2. The header according to claim 1 wherein the hitch arm is connected to the mounting member of the first wheel arrangement so as apply a pulling force to the header from a tractor through the mounting member of the first wheel arrangement and so as to effect a steering movement of the first wheel arrangement about the respective vertical axis.

3. The header according to claim 1 wherein the second wheel of the second wheel arrangement couples, in the field position, to the first wheel of the second wheel arrangement.

4. The header according to claim 3 wherein each of the first and second wheels is carried on its own axle and wherein there is provided a snap coupler for connecting the axles side by side for rotation of the first and second wheels about a common axis.

5. The header according to claim 3 wherein the first and second wheels are connected to provide common height adjustment thereof relative to the frame.

6. The header according to claim 1 wherein there is provided a height adjustment system for adjusting the height of the first wheel relative to the header frame, wherein the swing arm allows vertical movement of the second wheel in the working position and wherein there is provided a connection for attachment of the second wheel to the first wheel in the working position such that the second wheel can be moved to the adjusted height of the first wheel.

7. The header according to claim 1 wherein the swing arm is mounted so as to allow vertical movement of the second wheel in the working position.

8. The header according to claim 1 wherein the swing arm is mounted for pivotal movement about a generally vertical axis between the transport position and the operating position.

9. The header according to claim 1 wherein the swing arm includes a coupling for connection to the frame in the transport position so as to communicate loading to the frame.

10. The header according to claim 9 wherein the swing arm is mounted so as to provide guidance of the pivotal movement between the operating position and the transport position such that the swing arm is moved to the transport position while presenting the coupling at a correct height for attachment to the frame.

11. The header according to claim 9 wherein the coupling includes a tower extending upwardly from the swing arm to the frame on which the frame sits for transferring vertical loads from the frame onto the swing arm and a link arm extending from the swing arm along the frame to a connection to the frame.

12. The header according to claim 9 wherein the coupling is foldable into a collapsed position on the swing arm for the working position.

13. The header according to claim 1 wherein the coupling includes a coupling plate on the frame having a key-hole shaped slot therein defining a larger open end and a narrower slot end and wherein the coupling includes a coupling pin connected to the swing arm for engaging through the key-hole shaped slot, with an upper locating head arranged such that the locating head passes through the larger open end when the coupling pin is located at the larger open end and is held behind the coupling plate when the coupling pin is located at the narrower slot end, and wherein the coupling includes a spring mounted locking pin connected to the swing arm for locating in a hole in the coupling plate to locate the coupling pin at the narrower slot end of the slot.

14. The header according to claim 1 wherein there is provided a height adjustment mechanism for adjusting the height of the first wheel of the second wheel arrangement relative to the frame comprising:

a first portion attached to either the frame or the first wheel and a second portion attached to the other of the first wheel and the frame;

the first portion including a generally vertical guide slot and a plurality of locating receptacles at spaced positions along the guide slot;

the second portion including a locating bar which is mounted in the guide slot so as to be slidable along the guide slot so as to adjust the height of the first portion relative to the second portion, the locating bar being movable into a selected one of the locating receptacles when a height has been selected so as to hold the locating bar against movement along the guide slot;

and a manually operable handle to which the locating bar is attached which is pivotally movable between a locked position and an adjust position so as to move the locating bar between the selected receptacle and the guide slot.

15. The header according to claim 14 wherein the manually operable handle carries a second bar parallel to the locating bar wherein the second bar and the locating bar are movable by the pivotal movement of the locking handle between the locked position and the adjust position such that in the locked position the locating bar is in the receptacle and is held therein by the second bar in the guide slot and such that in the adjust position the locating bar and the second bar are both in the guide slot allowing sliding movement of both along the guide slot.

16. The header according to claim 14 wherein the guide slot and receptacles are defined by a member having two parallel side walls with each side wall having a slot and receptacles formed therein and wherein the locating bar spans the two side walls.

* * * * *